Aug. 28, 1962  T. ARGE  3,051,312
PUMP AND FILTER SYSTEM FOR SWIMMING POOLS
Filed Dec. 7, 1959  2 Sheets-Sheet 1
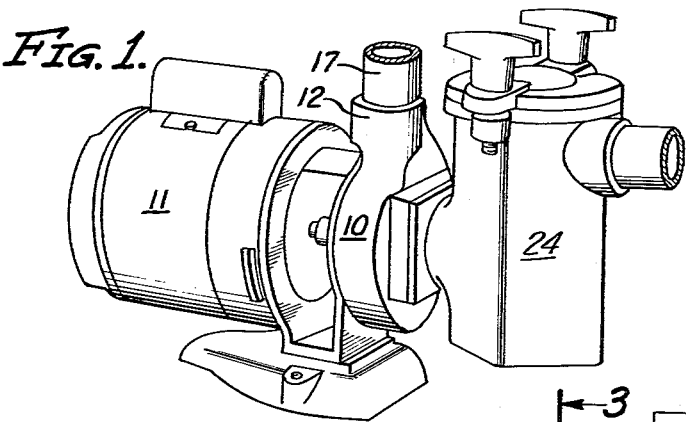
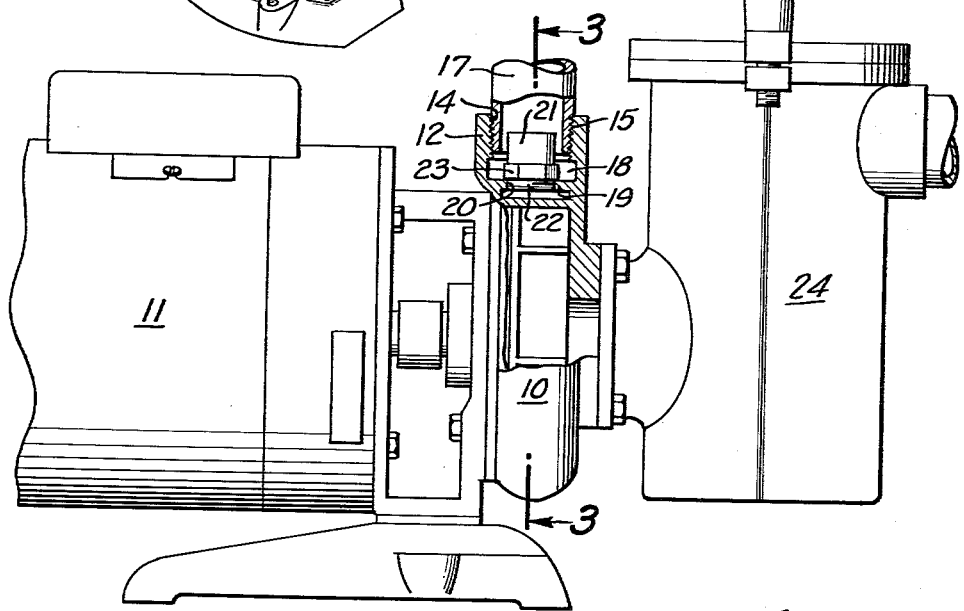
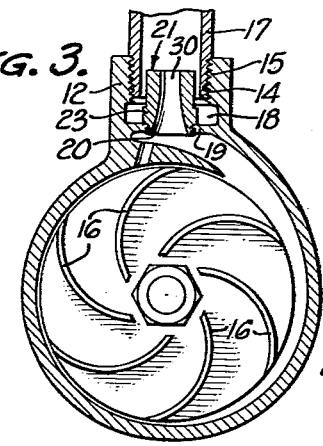
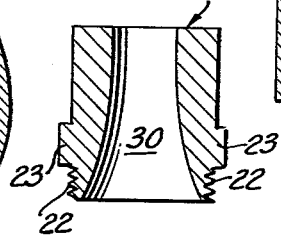
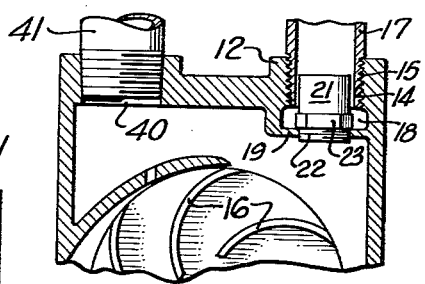
INVENTOR.
THORSTEIN ARGE
BY Robert C. Comstock
ATTORNEY Aug. 28, 1962 T. ARGE 3,051,312
PUMP AND FILTER SYSTEM FOR SWIMMING POOLS
Filed Dec. 7, 1959 2 Sheets-Sheet 2

INVENTOR.
THORSTEIN ARGE
BY
ATTORNEY

United States Patent Office 3,051,312
Patented Aug. 28, 1962

3,051,312
PUMP AND FILTER SYSTEM FOR
SWIMMING POOLS
Thorstein Arge, 165 S. Fair Oaks Ave., Pasadena, Calif.
Filed Dec. 7, 1959, Ser. No. 857,711
3 Claims. (Cl. 210—137)

This invention relates to a pump and filter system for swimming pools.

It is the primary object of my invention to provide a swimming pool pump and filter system having a built-in tamper-proof outlet control which provides the desired quantity and rate of water flow through the filter.

Swimming pool pumps are customarily used in connection with filters, the most common type of filter being one using diatomaceous earth. This type of filter comprises a tank having a plurality of filter elements disposed therein. These filter elements comprise circular hollow disks which are covered with cloth. The pool owner introduces a slurry of diatomaceous earth into the water. This earth settles on the cloth in the form of a cake to provide an effective filter medium. The swimming pool water is pumped into the filter, through the cloth and cake and then back to the pool. The impurities are removed by the filter cloth and cake.

When the diatomaceous earth is clean, the rate of water flow through it is at the maximum. As the cake becomes filled with dirt, it presents a greater resistance to the water flow and the rate of flow slows down. In practice, a filter may last anywhere from one to eight weeks before it must be cleaned.

In order for the filter to function properly, it is necessary that the rate of water flow provided by the pump is not too large or too small for the filter. It is an object of my invention to provide a swimming pool pump having a built-in outlet control which provides the desired rate of water flow, regardless of the condition of the filter.

It is a further object of my invention to provide such an outlet control which cannot be changed by the pool owner, to avoid undesirable interference with the proper pump operation and rate of water flow.

It is a further object of my invention to provide an alternative embodiment of my invention in which the pump is provided with two outlets, one controlled and the other uncontrolled. The controlled outlet can thus be used for normal operation. When the filter becomes clogged and must be cleaned, the full capacity of the pump can be connected to the discharge line of the filter through the uncontrolled outlet. The flow of water through the filter is thus reversed and simultaneously increased substantially, so that the used diatomaceous earth and dirt can be quickly washed from the filter cloth and flushed through the waste line.

It is another object of my invention to provide a swimming pool pump in which a selected outlet flow control member may be mounted to provide the desired rate of water flow for the particular filter with which the pump is used. All of the pumps are thus constructed identically, with only the outlet control member being variable to provide the proper rate of water flow.

Still another object of my invention is to provide an outlet control member having a minimum amount of friction and pressure loss at reduced rates of flow.

It is also among the objects of my invention to provide a device of the class described which is economical to manufacture and which is simple to construct and use, so that it is adapted for widespread practical use.

My invention also comprises such other objects, advantages and capabilities as will later more fully appear and which are inherently possessed by my invention.

While I have shown in the accompanying drawings preferred embodiments of my invention, it should be understood that the same are susceptible of modification and change without departing from the spirit of my invention.

Referring to the drawings,

FIG. 1 is a perspective view of my pump in use;

FIG. 2 is a side elevational view of the same, with part of the motor omitted and part of the pump structure broken away and shown in section in order to show the outlet control member in use;

FIG. 3 is a sectional view of the same, taken on lines 3—3 of FIG. 2;

FIG. 4 is an enlarged sectional view of the outlet control member;

FIG. 5 is a partial sectional view of an alternative embodiment of my invention, showing a pump having both a controlled and an uncontrolled outlet, with the outlet control member being shown in elevation;

Figure 6:
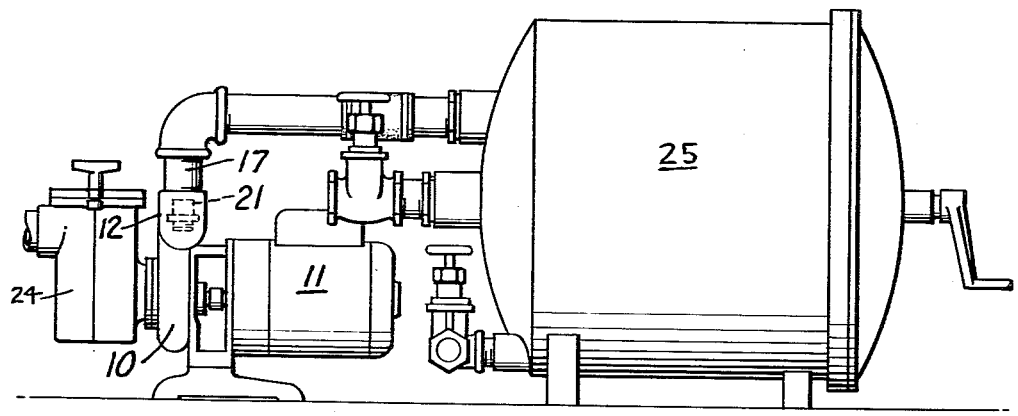
FIG. 6 is a side elevational view of the pump in use, also showing the motor, strainer pot and filter and the connections therebetween.

A preferred embodiment which has been selected to illustrate my invention comprises a centrifugal pump 10, which is operated by an electric motor 11, which is connected to a suitable source of electrical supply. The motor 11 rotatably drives an impeller having a plurality of curved blades 16. A strainer pot 24 is connected to the pump inlet. The construction and operation of the pump are the conventional construction and operation of a centrifugal pump and do not comprise a part of my invention.

The pump includes a collar 12, the interior of which forms the discharge outlet for the pump 10. The interior of the collar 12 is hollow and cylindrical and is provided with internal screw threading 14 which receives the complementary external screw threading 15 of an outlet pipe 17 which extends from the pump 10 to a conventional diatomaceous earth filter 25, as shown in FIG. 6 of the drawings.

The portion of the interior of the collar 12 beneath the screw threading 14 is cut away to provide a relieved area 18. Beneath the relieved area 18 adjacent the inner end of the collar 12 is an inwardly directed annular flange 19, which is provided with internal screw threading 20 having an inner diameter less than that of the screw threading 14 adjacent the outer end of the collar 12.

Removably mounted within the collar 12 is a water flow orifice or outlet control member 21, which is preferably formed of a single piece of metal. The outlet control member 21 is provided at one end thereof with external screw threading 22 which is complementary to and is adapted to engage the screw threading 20 of the flange 19. Directly adjacent to the screw threading 22 is an outwardly directed hexagonal flange 23, which symmetrically surrounds the outlet control member 21. The outer surface of the remainder of the outlet control member 21 is smooth and cylindrical and is substantially smaller in diameter than the screw threading 14.

The outer diameter of the hexagonal flange 23 is preferably somewhat smaller than the inner diameter of the screw threading 14, so that sufficient clearance is provided for a socket wrench or other suitable mounting tool to be inserted into the collar 12 in order to engage the hexagonal flange 23 and rotate the outlet control member 21 to engage the threads 22 and 20.

When the outlet control member 21 is rotated down into its normal position, the bottom of the hexagonal flange 23 contacts the top of the annular flange 19. The outlet control member 21 is disposed entirely within the collar 12, its upper end being disposed substantially beneath the outer end of the collar 12.

The cylindrical outer end of the outlet control member 21 is substantially smaller in outer diameter than the inner diameter of the collar 12, so that the outlet pipe 17 fits around the outlet control member 21.

The interior of the outlet control member 21 is provided with a water flow passage 30 which extends therethrough. The passage 30 is extremely wide at the bottom or inner end and tapers in a smooth curve to a smaller straight opening at its upper or outer end. The diameter of the straight opening determines the rate of water flow, while the smoothly curved taper minimizes the friction and pressure loss as the water flows through the passage 30.

In use, all of the pumps are made identically without the outlet control member 21. Suitable outlet control members of various sizes for the desired rates of water flow are then inserted in the collars 12 in the manner described and the completed pumps stocked accordingly. The purchaser or user is not aware of the existence or construction of the outlet control member 21 and has no way of altering or tampering with it. The manufacturer has the advantage of making all sizes of pumps the same, with the rate of water flow being controlled by the type of outlet control member 21 which is installed as the final step of manufacture. The manufacturer can also easily change one size of pump to another by merely changing the outlet control member 21.

By using an outlet control member 21 of the proper size for the filter 25 with which it is to be used, it is possible to restrict the pump to an output of not more than two gallons per minute per square foot of filter area, while maintaining a minimum output of one-half to one gallon per minute per square foot of filter area. This closely regulated water flow is due to the orifice acting inversely to the filter and acts to provide the optimum filtering action.

FIG. 5 of the drawings shows a pump having a collar 12 and outlet control member 21, all of which are formed in the manner described above. The pump also has a second outlet 40 which is unrestricted. A second outlet pipe 41 is connected to the outlet 40. The outlet pipe 17 is connected to the filter for normal use of the pump. When the filter 25 is to be cleaned, the second outlet pipe 41 is connected to the discharge line of the filter 25 in order to provide maximum unrestricted water pressure to cleanse the dirt and diatomaceous earth from the filter cloth and flush it away. New diatomaceous earth is then supplied to the filter 25.

With this embodiment of my invention, it is possible to have restricted water flow for optimum filter operation and at the same time have unrestricted maximum water flow for back flushing the filter 27.

I claim:

1. In a pump and filter system for swimming pools, a pump having a cylindrical hollow collar forming a water outlet, said collar having internal screw threading adapted to removably receive the external screw threading of one end of an outlet pipe, an annnular radially inwardly directed flange disposed within said collar and spaced inwardly from said screw threading, said annular flange having internal screw threading of a substantially smaller diameter than the screw threading of said collar, a diatomaceous earth filter connected to the opposite end of said outlet pipe, the rate of flow of water from said pump through said filter being maximum when said filter is clean and being progressively reduced by increased opposition as said filter becomes dirty, means for controlling the rate of water flow through said filter comprising an outlet control member removably mounted within said collar, said outlet control member having at one end thereof external screw threading adapted to engage the internal screw threading of said annular flange, said outlet control member being removably mounted and disposed entirely within said collar, a water flow orifice extending through said outlet control member, said orifice having a large opening at the inner end thereof and a substantially narrower straight opening at the outer end thereof, the walls of said orifice forming a curve tapering from the inner end of said orifice toward the outer end thereof, the outer end of said outlet control member being disposed within the end of said outlet pipe, said orifice providing maximum opposition to water flow from said pump when said filter is clean and substantially less opposition as said filter becomes dirty, whereby the flow of water through said filter is regulated by said orifice in a manner inverse to the action of said filter upon said water flow.

2. In a pump and filter system for swimming pools, a pump having a cylindrical hollow collar forming a water outlet, said collar having internal screw threading adapted to removably receive the external screw threading of one end of an outlet pipe, an annular radially inwardly directed flange disposed within said collar and spaced inwardly from said screw threading, said annular flange having internal screw threading of a substantially smaller diameter than the screw threading of said collar, a diatomaceous earth filter connected to the opposite end of said outlet pipe, the rate of flow of water from said pump through said filter being maximum when said filter is clean and being progressively reduced by increased opposition as said filter becomes dirty, means for controlling the rate of water flow through said filter comprising an outlet control member removably mounted within said collar, said outlet control member having at one end thereof external screw threading adapted to engage the internal screw threading of said annular flange, a water flow orifice extending through said outlet control member, said orifice having a large opening at the inner end thereof and a substantially narrower opening at the outer end thereof, the walls of said orifice forming a curve tapering from the inner end of said orifice toward the outer end thereof, said orifice providing maximum opposition to water flow from said pump when said filter is clean and substantially less opposition as said filter becomes dirty, whereby the flow of water through said filter is regulated by said orifice in a manner inverse to the action of said filter upon said water flow.

3. In a pump and filter system for swimming pools, a pump having a hollow collar forming a water outlet, said collar having internal screw threading adapted to removably receive the external screw threading of one end of an outlet pipe, an annular radially inwardly directed flange spaced inwardly from said screw threading, said annular flange having internal screw threading, a diatomaceous earth filter connected to the opposite end of said outlet pipe, the rate of flow of water from said pump through said filter being maximum when said filter is clean and being progressively reduced by increased opposition as said filter becomes dirty, means for controlling the rate of water flow through said filter comprising an outlet control member removably mounted within said collar, said outlet control member having external screw threading adapted to engage the internal screw threading of said annular flange, a water flow orifice extending through said outlet control member, said orifice having a large opening at the inner end thereof and a substantially narrower opening at the outer end thereof, the walls of said orifice forming a curve tapering from the inner end of said orifice toward the outer end thereof, said orifice providing maximum opposition to water flow from said pump when said filter is clean and substantially less opposition as said filter becomes dirty, whereby the flow of water through said filter is regulated by said orifice in a manner inverse to the action of said filter upon said water flow.

References Cited in the file of this patent

UNITED STATES PATENTS

| | | |
|---|---|---|
| 1,914,919 | Heermans | June 20, 1933 |
| 2,007,138 | Becker | July 2, 1935 |
| 2,107,084 | Pletcher | Feb. 1, 1938 |
| 2,268,358 | Turner | Dec. 30, 1941 |
| 2,452,421 | Ames | Oct. 26, 1948 |
| 2,455,130 | Lomax | Nov. 30, 1948 |
| 2,715,016 | Veneziani et al. | Aug. 9, 1955 |
| 2,792,943 | Mackintosh | May 21, 1957 |
| 2,910,009 | Fraser et al. | Oct. 27, 1959 |
| 2,985,308 | Koupal | May 23, 1961 |